United States Patent
Raja et al.

(10) Patent No.: US 12,448,348 B2
(45) Date of Patent: Oct. 21, 2025

(54) MIXED METAL OXIDE CATALYSED AND CAVITATION INFLUENCED PROCESS FOR HYDRATION OF NITRILE

(71) Applicant: COUNCIL OF SCIENTIFIC AND INDUSTRIAL RESEARCH, New Delhi (IN)

(72) Inventors: Thirumalaiswamy Raja, Maharashtra (IN); Nikitra Nihal Chand Gupta, Maharashtra (IN); Vipul Subhash Patil, Maharashtra (IN); Amrin Sattarkhan Punekar, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 1015 days.

(21) Appl. No.: 17/416,742

(22) PCT Filed: Dec. 20, 2019

(86) PCT No.: PCT/IN2019/050942
§ 371 (c)(1),
(2) Date: Jun. 21, 2021

(87) PCT Pub. No.: WO2020/129088
PCT Pub. Date: Jun. 25, 2020

(65) Prior Publication Data
US 2022/0048851 A1     Feb. 17, 2022

(30) Foreign Application Priority Data
Dec. 21, 2018   (IN)  .............................. 201811048598

(51) Int. Cl.
*B01J 23/46* (2006.01)
*B01J 19/00* (2006.01)
(Continued)

(52) U.S. Cl.
CPC ......... *C07C 231/065* (2013.01); *B01J 19/008* (2013.01); *B01J 23/63* (2013.01);
(Continued)

(58) Field of Classification Search
CPC ...... B01J 23/462; B01J 23/464; B01J 23/468; B01J 23/63; B01J 23/6527; B01J 37/0045;
(Continued)

(56) References Cited

U.S. PATENT DOCUMENTS 3,897,367 A * 7/1975 Lauder ................. B01D 53/945
  423/213.2
4,657,885 A * 4/1987 Fiato ....................... C07C 1/044
  502/241
(Continued)

FOREIGN PATENT DOCUMENTS

WO     WO-2006131507 A1 * 12/2006  ............ B01J 23/002

OTHER PUBLICATIONS

CN107442117. Xiao Yihong et al. "Catalyst for tail gas purification". Espacenet 2017, Patent Translate, p. 1-9. (Year: 2017).*
(Continued)

*Primary Examiner* — Cam N. Nguyen
(74) *Attorney, Agent, or Firm* — Norton Rose Fulbright US LLP

(57) ABSTRACT

The present invention discloses a metal-catalyzed process for hydration of nitrile under the influence of the ultrasonic cavitation effect. The present invention further discloses a catalyst of formula (I), wherein the catalyst is used for process for hydration of nitrile and process for preparation thereof.

$A_X B_Y C_Z$     Formula (I)

8 Claims, 11 Drawing Sheets

(51) Int. Cl.
 B01J 23/63 (2006.01)
 B01J 23/652 (2006.01)
 B01J 37/00 (2006.01)
 B01J 37/04 (2006.01)
 B01J 37/08 (2006.01)
 C07C 231/06 (2006.01)

(52) U.S. Cl.
 CPC ....... *B01J 37/0045* (2013.01); *B01J 37/0063* (2013.01); *B01J 37/04* (2013.01); *B01J 37/082* (2013.01)

(58) Field of Classification Search
 CPC ...... B01J 37/0063; B01J 37/04; B01J 37/082; B01J 19/008; C07C 231/065
 See application file for complete search history.

(56) References Cited

U.S. PATENT DOCUMENTS

| | | | | |
|---|---|---|---|---|
| 6,107,240 | A | 8/2000 | Wu et al. | |
| 7,166,263 | B2* | 1/2007 | Vanderspurt | B82Y 30/00 502/302 |
| 7,318,915 | B2* | 1/2008 | Jordan | B01D 53/945 502/352 |
| 7,612,011 | B2* | 11/2009 | Vanderspurt | C01G 27/006 502/302 |
| 7,641,875 | B1* | 1/2010 | Golden | C01G 53/006 502/313 |
| 9,101,916 | B2* | 8/2015 | Princivalle | B01D 53/864 |
| 10,265,684 | B2* | 4/2019 | Hatfield | F01N 3/101 |
| 10,919,026 | B2* | 2/2021 | Xiao | B01J 23/60 |
| 11,207,662 | B2* | 12/2021 | Berry | B01J 35/50 |
| 2003/0045423 | A1* | 3/2003 | Dindi | C01B 3/386 502/302 |
| 2003/0186805 | A1* | 10/2003 | Vanderspurt | C01B 3/16 423/263 |
| 2004/0204315 | A1* | 10/2004 | Krumpelt | B01J 23/866 502/303 |
| 2008/0242536 | A1* | 10/2008 | Myeong | B01J 23/10 502/355 |
| 2012/0111768 | A1* | 5/2012 | Elsen | C10G 49/02 502/352 |
| 2016/0318003 | A1* | 11/2016 | D'Souza | B01J 23/42 |
| 2017/0001913 | A1* | 1/2017 | Zhou | B01J 23/10 |
| 2024/0116770 | A1* | 4/2024 | Nagaoka | C01F 17/241 |

OTHER PUBLICATIONS

Garcia-Álvarez R. "Metal-catalyzed amide bond-forming reactions in an environmentally friendly aqueous medium: nitrile hydrations and beyond." *Green Chem.* 2013, 15(1), 46-66.

International Search Report and Written Opinion issued in Corresponding PCT Application No. PCT/IN2019/050942, dated Mar. 12, 2020.

Luo et al., "Effect of La2O3 on Ru/CeO2-La2O3 Catalyst for Ammonia Synthesis" *Catalysis Letters* 2009, 133(3-4), 382-387.

Murahashi et al., "Ruthenium-catalyzed amidation of nitriles with amines. A novel, facile route to amides and polyamides" *Journal of the American Chemical Society* 1986, 108(24), 7846-7847.

Niwa et al., "The Effect of Lanthanide Oxides as a Support for Ruthenium Catalysts in Ammonia Synthesis" *Journal of Catalysis* 1996, 162(1), 138-142.

Stoian et al., "Improving the Stability of CeO2 Catalyst by Rare Earth Metal Promotion and Molecular Insights in the Dimethyl Carbonate Synthesis from CO2 and Methanol with 2-Cyanopyridine." *ACS Catalysis* 2018, 8(4), 3181-3193.

Tamura et al., "CeO2-catalyzed nitrile hydration to amide: reaction mechanism and active sites" *Catal. Sci. Technol.* 2013, 3, 1386-1393.

Tamura et al., "Efficient and Substrate-Specific Hydration of Nitriles to Amides in Water by Using a CeO2 Catalyst" *Chem. Eur. J.* 2011, 17(41), 11428-11431.

Zhang et al., "Highly efficient Ru/Sm2O3-CeO2 catalyst for ammonia synthesis" *Catalysis Communications* 2011, 15(1), 23-26.

\* cited by examiner (a)

(b)

(a)

(b)

(a)

(b)

(a)

(b)

MIXED METAL OXIDE CATALYSED AND CAVITATION INFLUENCED PROCESS FOR HYDRATION OF NITRILE

CROSS-REFERENCE TO RELATED APPLICATIONS

This application is a national phase application under 35 U.S.C. § 371 of International Application No. PCT/IN2019/050942 filed 20 Dec. 2019, which claims priority to Indian Patent Application number 201811048598 filed 21 Dec. 2018. The entire contents of each of the above-referenced disclosures is specifically incorporated herein by reference without disclaimer.

FIELD OF THE INVENTION

The present invention relates to a metal-catalyzed process for hydration of nitrile under the influence of ultrasonic cavitation effect. The present invention further relates to a catalyst of formula (I), wherein the catalyst is used for the process for hydration of nitrile and process for preparation thereof.

BACKGROUND AND PRIOR ART OF THE INVENTION

Nitriles are interesting types of chemical scavengers for the removal of water co-generated during the reactions. Hydration of nitriles produces amides, which could be dehydrated in a separate cycle and the nitrile, be regenerated. Hydration of nitriles to generate the corresponding amides is an important transformation from both academic and industrial points of view. Amides not only constitute versatile building blocks in synthetic organic chemistry but also exhibit a wide range of industrial applications and pharmacological interest.

Article titled "Ceria/polymer hybrid nanoparticles as efficient catalysts for the hydration of nitriles to amides" by Margherita Mari et al. published in ACS Applied Materials and Interfaces, 2015, 7 (20), pp 10727-10733 reports the synthesis of ceria/polymer hybrid nanoparticles and their use as an active supported catalysts for the hydration of nitriles to amide, exemplified with the conversion of 2-cyanopyridine to 2-picolinamide. The polymeric cores, made of either polystyrene (PS) or poly(methyl methacrylate) (PMMA), are prepared by miniemulsion copolymerization in the presence of different functional comonomers that provide carboxylic or phosphate groups: acrylic acid, maleic acid, and ethylene glycol methacrylate phosphate. The functional groups of the comonomers generate a corona around the central polymer particle and serve as nucleating agents for the in situ crystallization of cerium(IV) oxide. The obtained hybrid nanoparticles can be easily redispersed in water or ethanol. The conversion of amides to nitriles was quantitative for most of the catalytic samples, with yields close to 100%. According to our experimental observations by high-performance liquid chromatography (HPLC), no workup is needed to separate the product from unreacted substrate. The substrate remains absorbed on the catalyst surface, whereas the product can be easily separated. The catalysts are shown to be recyclable and can be reused for a large number of cycles without loss in efficiency.

Base catalysts with appropriate acidity. $CeO_2$ has been reported having a wide range of applications in organic reactions at high temperatures (150° C.-400° C.), such as direct synthesis of Di-methyl Carbonate from methanol and $CO_2$, alkylation of aromatic compounds, dehydration of alcohols/amides, reduction of carboxylic acid.

Reported catalyst for this process are mainly $CeO_2$, etc are having some drawbacks like process needs high retention time for the reactants, high molar ratio of reactant (Nitriles) with water ($H_2O$), high catalyst loading amount, high pressure conditions and high temperature conditions, which is very difficult in post-processing of these products to get high purity of product.

To overcome these entire drawbacks, present work is to find a novel, highly active, and stable catalyst phase transfer catalyst composition consisting of Lanthanides as promoters & Ru as co-promoter has been discovered and experimentally tested at various conditions under the influence of ultrasonic cavitation inception.

OBJECTIVES OF THE INVENTION

The main aim of the present invention is to provide a metal-catalyzed process for hydration of nitrile using ultrasonic cavitation influence.

Another objective of the present invention is to provide a catalyst of formula (I), wherein the catalyst is highly active to lower the residence time as well as low catalyst loading and low nitrile to water molar ratio to a considerable amount, selectivity 100%.

Still another objective of the present invention is to provide a process for the synthesis of the catalyst of formula (I).

SUMMARY OF THE INVENTION

Accordingly, the present invention provides a metal-catalyzed process for the hydration of nitrile comprising heating the reaction mixture of nitrile, solvent, catalyst of formula (I) at a temperature range of 30 to 140° C. for a time period in the range of 0.25 to 10 hours under the influence of ultrasonic cavitation to afford respective amide, wherein the reaction mixture is loaded in reactor.

The nitrile is selected from the group consisting of an aliphatic or aromatic nitrile.

The nitrile is selected from the group consisting of 2-Cyanopyridine, 3-Cyanopyridine, 4-Cyanopyridine Benzonitrile, Acetonitrile, O-Tolunitrile or methoxyacetonitrile.

The solvent is selected from the group consisting of water, methanol, ethanol alone or in combination thereof.

The amide is selected from the group consisting of aliphatic amide and aromatic amide.

The amide is selected from the group consisting of 2-Picolinamide, 3-Picolinamide 4-Picolinamide Benzamide, Acetamide, O-toluamide or methoxyacetamide.

Metal-catalyzed process for hydration of nitrile using the catalyst of formula (I) under the influence of ultra sonic cavitation of Frequency 16-28 khz to achieve the maximum conversion at lower temperature (35° C.).

In an embodiment, the present invention provides the catalyst of formula (I) represented as $A_XB_YC_Z$ <span style="float:right">Formula (I)</span>

Wherein

Promoters (A):—Promoters can be oxide of lanthanides may be a divalent or trivalent transition metal or mixture of these at appropriate ratios of their oxides from group number III of periodic table e.g. —La, Ce, Sm, Gd, Pr, and Nd or it may be the spinel form (AB$_2$O4) of these elements with Co-promoters X is the wt % of the promoter varies from 0.01-99%.

Supports (B):—Catalyst support can be the oxide of metal from group number III B which may have multiple functionalities in the catalyst composition as it may act as support as well as promoter and phase stabilizer or it may be a transition element or inner transition element e.g. —Ce, La, Sm, Pr, Gd, W, Ir.

Y is the wt % of catalyst support varies from 0.01-99%.

Co-promoters (C):—Co-promoters can be the oxide of transition element having variable oxidation states ranging from 1 to 8 from group number VIII of periodic table e.g. Ru, Rh, and Pd.

Z is the wt % of the Co-promoters varies from 0.01-25%.

The catalyst of formula (I) is selected from the group consisting of $Ce_{90}Sm_{9.5}Ru_{0.5}$, $Ce_{90}La_{9.5}Ru_{0.5}$, $Ce_{90}Pr_{9.5}Ru_{0.5}$, $Ce_{90}Gd_{9.5}Ru_{0.5}$, $Ce_{90}W_{9.5}Ru_{0.5}$, $Ce_{90}Ir_{9.5}Ru_{0.5}$, $Ce_{90}Pr_{9.5}Rh_{0.5}$, $Ce_{90}Gd_{9.5}Rh_{0.5}$, $Ce_{90}W_{9.5}Rh_{0.5}$ or $Ce_{90}Ir_{9.5}Rh_{0.5}$.

The catalyst of formula (I) is cheaper and can be recycled as it is a heterogeneous catalyst.

The catalyst of formula (I) is having synergistically appropriate acidic as well as basic sites in the same catalyst.

In another embodiment, the present invention provides a process for the preparation of the catalyst of formula (I) comprising the steps of:
a) dissolving ceria metal nitrate hexahydrate as a precursor in a solvent followed by vigorous stirring, wherein the addition of precursor started at 5° C. by keeping beaker in chiller and continued until solution temperature reaches 25° C. to 30° C. to afford solution A;
b) mixing metal precursor 1 into metal precursor 2 solution by adding an excess of solvent to afford solution B;
c) adding solution B of step (b) into solution A of step (a) with constant stirring at a temperature in the range of 25° C. to 30° C. to form slurry and
d) ageing the slurry of step (c) at the temperature in the range of 70° C. to 200° C. for the time period in the range of 24 to 30 hours followed by drying and calcination with ramp rate of 1-5° C./min to 150-220° C. for 1-30 hrs again cooling and fine crushing the material and further calcinations at 450-550° C. with ramp rate of 1-5° C./min for 1-30 hrs then finally heated to 900° C. and keeping constant for 5-50 h to afford the catalyst of formula (I).
e) The metal precursor 1 of step (b) is selected from La/Sm precursor as Lantanium salt or Samarium salt.
f) The metal precursor 2 of step (b) is selected from Ru precursor most preferably Ruthenium salt sources.
g) The solvent is selected from the group consisting of water, methanol, ethanol alone or mixtures thereof.

Figure 1:
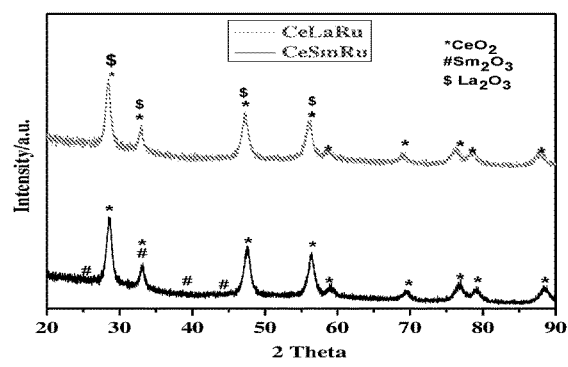
FIG. 1: XRD pattern for different Ceria oxide-based catalyst

1. Three necked round bottom glass reactor, 2. Ultrasound frequency, 3. Water condenser, 4. Mechanical stirring, 5. Cavities, 6. Organic Layer, 7. Aqueous layer

DETAILED DESCRIPTION OF THE INVENTION

The invention will now be described in detail in connection with certain preferred and optional embodiments, so that various aspects thereof may be more fully understood and appreciated.

The present invention provides a metal-catalyzed process for hydration of nitrile. The present invention provides a catalyst of formula (I), wherein the catalyst is used for process for hydration of nitrile and process for preparation thereof.

In an embodiment, the present invention provides a metal-catalyzed process for hydration of nitrile comprises heating the reaction mixture of nitrile, solvent, catalyst of formula (I) at the temperature range of 30 to 140° C. for the time period in the range of 0.25 to 10 hours to afford respective amide, wherein the reaction mixture is taken in reactor.

The nitrile is selected from different aliphatic and aromatic nitrile, preferably selected from 2-Cyanopyridine, 3-Cyanopyridine, 4-Cyanopyridine Benzonitrile, Acetonitrile, O-Tolunitrile, methoxyacetonitrile.

The solvent is selected from water, methanol, ethanol, and mixture therefrom.

The amide is selected from 2-Picolinamide, 3-Picolinamide 4-Picolinamide Benzamide, Acetamide, O-toluamide and methoxyacetamide.

In another embodiment, the present invention provides the catalyst of formula (I) is represented as $$A_XB_YC_Z \quad \text{Formula (I)}$$

Wherein

Promoters (A):—Promoters can be oxide of lanthanides may be a divalent or trivalent transition metal or mixture of these at appropriate ratios of their oxides from group number III B of periodic table e.g. —La, Ce, Sm, Gd, Pr and Nd or it may be the spinel form ($AB_2O4$) of these elements with Co-promoters X is the wt % of the promoter varies from 0.01-99%.

Supports (B):—Catalyst support can be the oxide of metal from group number III B which may have multiple functionalities in the catalyst composition as it may act as support as well as promoter and phase stabilizer or it may be a transition element or inner transition element e.g. —Ce, La, Sm, Pr, Gd, W, Ir.

Y is the wt % of catalyst support varies from 0.01-99%.

Co-promoters (C):—Co-promoters can be the oxide of transition element having variable oxidation states ranging from 1 to 8 from group number VIII of periodic table e.g. Ru, Rh and Pd.

Z is the wt % of the Co-promoters varies from 0.01-25%.

The catalyst of formula (I) is selected from $Ce_{90}Sm_{9.5}Ru_{0.5}$, $Ce_{90}La_{9.5}Ru_{0.5}$, $Ce_{90}Pr_{9.5}Ru_{0.5}$, $Ce_{90}Gd_{9.5}Ru_{0.5}$, $Ce_{90}W_{9.5}Ru_{0.5}$, $Ce_{90}Ir_{9.5}Ru_{0.5}$, $Ce_{90}Pr_{9.5}Rh_{0.5}$, $Ce_{90}Gd_{9.5}Rh_{0.5}$, $Ce_{90}W_{9.5}Rh_{0.5}$ and $Ce_{90}Ir_{9.5}Rh_{0.5}$.

The catalyst of formula (I) is cheaper and can be recycled as it is a heterogeneous catalyst.

The catalyst of formula (I) is having synergistically appropriate acidic as well as basic sites in the same catalyst.

The catalyst shows yield in the range of 90-98% with 100% selectivity.

In still another embodiment, the present invention provides a process for the preparation of the catalyst of formula (I) comprising the steps of:
a) dissolving ceria metal nitrate hexahydrate as a precursor in a solvent followed by vigorous stirring, wherein the addition of precursor started at 5° C. by keeping beaker in the chiller and continued until solution temperature reaches 25° C. to 30° C. to afford solution A;
b) mixing metal precursor 1 into metal precursor 2 solution by adding an excess of solvent to provide solution B;
c) adding solution B of step (b) into solution A of step (a) with constant stirring at a temperature in the range of 25° C. to 30° C. to form slurry and
d) ageing the slurry of step (c) at the temperature in the range of 70° C. to 200° C. for the time period in the range of 24 to 30 hours followed by drying and calcination with ramp rate of 1-5° C./min to 150-220° C. for 1-30 hrs again cooling and fine crushing the material and further calcinations at 450-550° C. with ramp rate of 1-5° C./min for 1-30 hrs then finally heated to 900° C. and keeping constant for 5-50 h to afford the catalyst of formula (I).

The metal precursor 1 is selected from La/Sm precursor, Lantanium salt, and Samarium salt.

The metal precursor 2 is selected from Ru precursor, Ruthenium salt sources.

The solvent is selected from water, methanol, ethanol, and mixtures therefrom.

The weight percentage of Ce ranging from 50-95%, whereas the weight percentage of La/Sm ranging from 1-20% and the weight percentage of Ru ranging from 0.1-10%.

Ce oxide support act as a reaction initiator which adsorb and dissociate water molecule and forming Ce-hydroxyl complex at the same time it is also forming a Ce-nitrile complex that further initiates the reaction. Sm/La and Ru oxides act as a promoter and co-promoter for the reaction as they provide acidic sites for the reactant adsorption.

The above-synthesized catalyst is further characterized by means of powder X-ray diffraction (XRD), Field Emission Scanning Electron Microscope (FE-SEM), Energy Dispersive X-Ray Analysis (EDX), high-resolution transmission electron microscopy (HR-TEM), $N_2$-adsorption-desorption (BET surface analysis), Temperature Programmed Desorption study for probe molecules (TPD of $NH_3$ and $CO_2$), FT-IR, X-ray photoelectron spectroscopy (XPS), Laser Raman spectra analysis.

X-ray powder diffraction (XRD) of the catalysts was carried out using X'Pert Pro (Philips) diffractometer with Cu-Kα radiation ($\lambda=1.5406$ Å) and a proportional counter as a detector. The XRD profile of the catalysts was recorded in the 2θ range of 10-90° with scanning rate of 4°/min. The mean crystal size (d) was calculated by the line broadening method with the Scherer equation $d=K\lambda/\beta \cos\theta$, where 'K' is Scherrer constant taken as 0.89, 'λ' is the wavelength of the X-ray, 'β' is the width of peak at half-maximum height, and 'θ' is the diffraction angle of $CeO_2(111)$.

Catalyst microstructure was investigated by Field emission scanning electron microscopy (FE-SEM). SEM was carried out on an FE-SEM instrument using an accelerating voltage of 10 kV. Samples of the materials were mechanically deposited on the holders and subsequently gold-coated to reduce charge buildup.

The high-resolution transmission electron microscopy (HR-TEM) is used for high-resolution imaging of thin films of a solid sample for microstructure and compositional analysis. The bright-field image is obtained from the diffracted electron beams, which are slightly off-angle from the transmitted beam. The typical operating condition of HR-TEM instrument (Jeol JEM 200) is 200 kV electrons (field emission gun), 10-6 mbar vacuum and 0.1 nm resolution. The topographic information obtained by HR-TEM in the vicinity of atomic resolution can be utilized for structural characterization and identification of various phases of mesoporous materials, viz., hexagonal, cubic or lamellar. When the reaction time is lengthened to 6 h, the spherical aggregates disappear and are replaced by a flaky structure with rounded edges. Longer reaction times result in smoother and larger flakes with well-defined jagged edges.

The BET surface area, total pore volume, and average pore size distribution were measured by $N_2$ sorption at −196° C. using Quanta chrome Autosorb IQ instrument. The surface area of the catalysts was calculated employing Brunauer Emmett and Teller (BET) equation.

The $NH_3/CO_2$ temperature-programmed desorption ($NH_3/CO_2$-TPD) profiles were recorded by TPD of Micromeritics-Autochem Instrument with a U-shape quartz reactor. Before the experiment, the sample was pre-treated in He gas at a flow rate of 30 mL min-1 at 600° C. for 30 min. After cooling down to 50° C., the sample was exposed to 10 mole % $NH_3/CO_2$ gas at 50° ° C. for 30 min and then purged with flowing He gas at the same temperature for 30 min to remove the reversibly and physically bound $NH_3/CO_2$. Subsequently, desorption process was carried out from 50° C. to 800° C. at a heating rate of 10° C./min in He stream.

FT-IR study was carried out at room temperature by using Nicolet iS50 FTIR Spectrometer. Laser Raman spectrum was recorded with Horiba JobinYvon HR 800 Raman spectrometer at room temperature using 632.82 nm excitation line of the He—Ne laser source in the spectral range from 100-800 nm by using objective 50×LWD. Resolution of instrument is 0.35 cm-1/pixel.

The X-ray photoelectron spectroscopy (XPS) was obtained at 25° C. on an X-ray Photo Spectrometer and UPS with Al Kα radiation as the excitation source at ultra-high vacuum (1.6×10-6 Pa). Binding energies for all elements present in catalyst were determined with Reference Binding energy for C1s line (284.8 eV) originating from unintended carbon.

The synthesized material is characterized using XRD and BET surface area analysis. FIG. 1 depicts that the different synthesized ceria based catalyst has a cubic fluorite structure with unit cell parameters of 0.5427 and 0.5432 nm and the average crystallite size of ceria based catalysts (CeSmRu/CeLaRu) have been determined using Debye-Scherer equation are found to be 10.6 nm and 12.3 nm respectively. The ceria based catalysts are having tunable acidic and basic (bi-functional) properties (Table 1). The ceria supported PTC catalysts show nearly equal acidic and basic (bi-functional) properties for CSR and CLR catalysts (Table 1). Table 1 also provides other physicochemical characteristics.

TABLE 1

Physical characterization of different Ceria oxide-based catalyst

| Catalyst | Crystallite size, D (nm) | Unit Cell Parameter (nm) | $S_{BET}$ ($m^2/g$) | Average pore size (nm) | Total pore volume (cc/g) | Total acidity (mmol/g) | Total basicity (mmol/g) |
|---|---|---|---|---|---|---|---|
| CeSmRu | 10.6 | 0.5427 | 86.75 | 2.42 | 0.105 | 0.43 | 0.41 |
| CeLaRu | 12.3 | 0.5432 | 79.0 | 2.69 | 0.106 | 0.49 | 0.49 |

As shown in FIG. 1, the peaks of $CeO_2$ exhibit (a) a bit poor crystallinity with smaller crystallite size in CSR, and this catalyst shows the existence of many lattice defects having simple cubic fluorite structure (JCPDF04-0593 and space group Fm3m (225). Both factors confirmed by XRD also agreeing with the SEM result, which indicated that defects sites of $CeO_2$ supported catalyst might perform a better activity for the hydration reaction.

Figure 2:
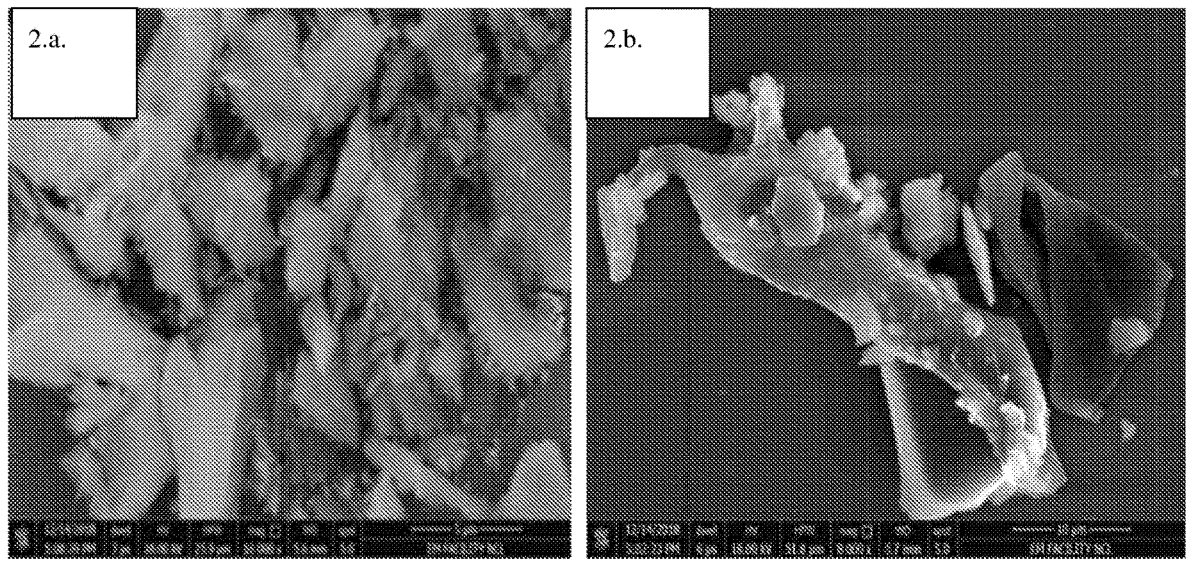
FIG. 2: SEM profiles for different Ceria supported PTC oxides of CSR(2.a) and CLR(2.b) catalyst

FIG. 2 discloses SEM profiles for different Ceria supported PTC oxides of CSR(2.a) and CLR(2.b) catalyst. The SEM profile shows platelets and irregular shape with the edge length of 5 μm to 10 μm (FIG. 2.a. &2.b); despite the distribution of the crystals in high density, the presence of agglomeration demonstrates the homogenous solid solution formation by the dispersion of Sm/La and Ru oxide over the $CeO_2$ surface.

Figure 3:
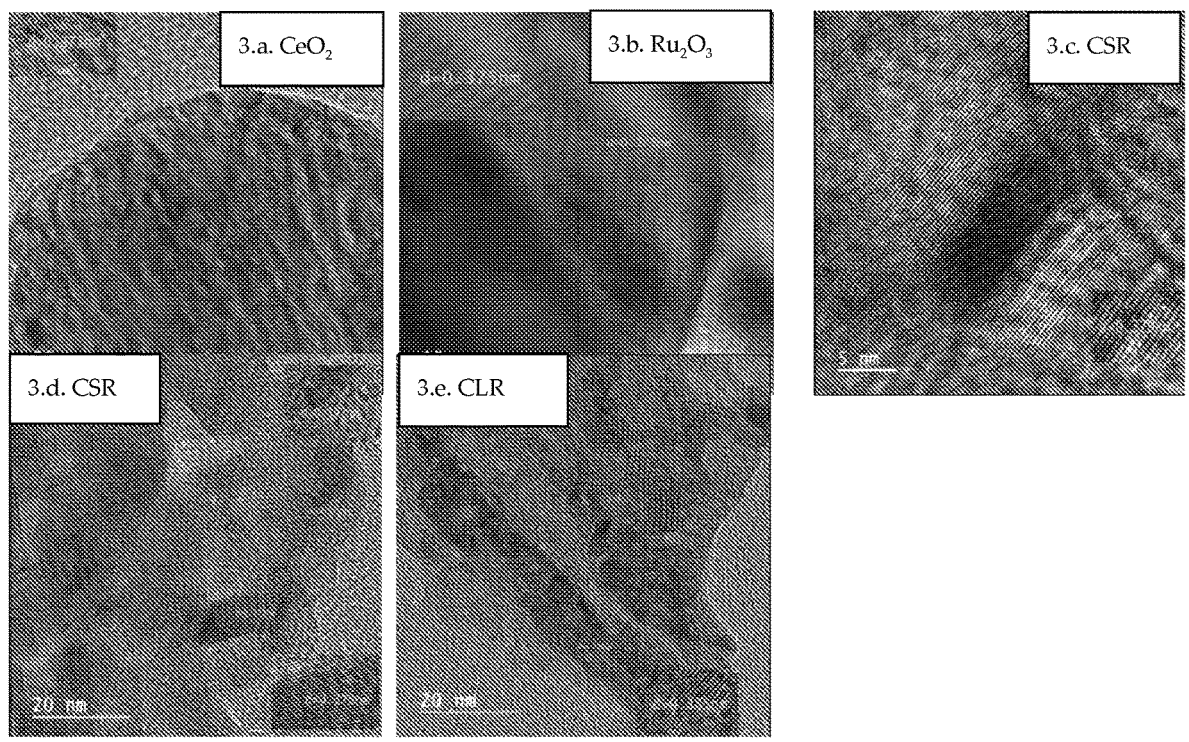
FIG. 3: (a-e) TEM images of CeO$_2$ supported PTC CSR and CLR catalysts (a) pure CeO, (b) Ru$_2$O$_3$, (c) CSR with 5 nm, (d) CSR with 20 nm, (e) CLR with 20 nm

FIG. 3 discloses (a-e) shows HRTEM for CSR and CLR catalysts. Apart from main ceria features in both cases, La/Sm oxide and $RuO_2$ features are distinctly seen nearby. This demonstrates the solid solution nature of the reported catalysts in this communication. The marginal shift in d-spacing values (shown in HRTEM images) is attributed to the stress of accommodating La/Sa and Ru oxides in the ceria crystallites.

In FIG. 3.e. $La_2O_3$ and $CeO_2$ show overlapped lattice fringes for (CLR) oxides (d-0.34 nm) and FIG. 3.c and d. also shows the overlapped lattice fringes for (CSR) oxides (d-0.34 nm) and individually for $Sm_2O_3$ (d-0.228 nm)

Figure 4:
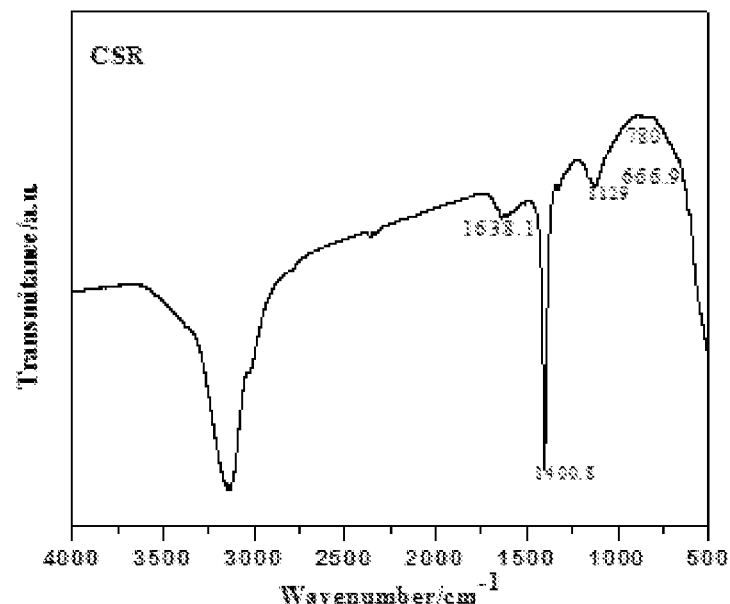
FIG. 4: a (CSR) & 4.b (CLR) FTIR spectra of CeO$_2$ supported PTC oxide catalyst
Figure 4:
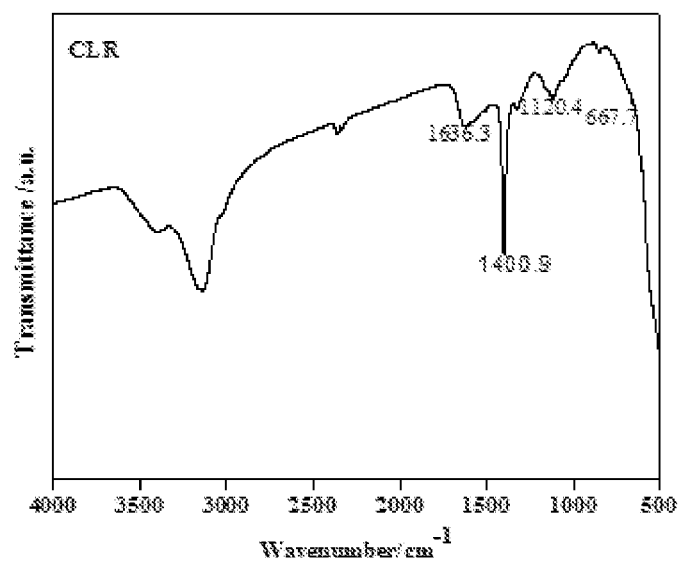

FIG. 4 discloses a (CSR) & 4.b (CLR) FTIR spectra of $CeO_2$ supported PTC oxide catalyst. The bands at 1638 and 3200 $cm^{-1}$ represents the water and the hydroxyl stretches, respectively. The intensive band at 1400 $cm^{-1}$ represents N—O stretch due to the presence of nitrate. The strong absorption band observed below 600 cm-1 represents the Ce—O stretch. No vibrational features due to Sm—O and La—O were observed, and this indicates the formation of homogeneous solid solution. XRD and HR-TEM results also support this conclusion.

Figure 5:
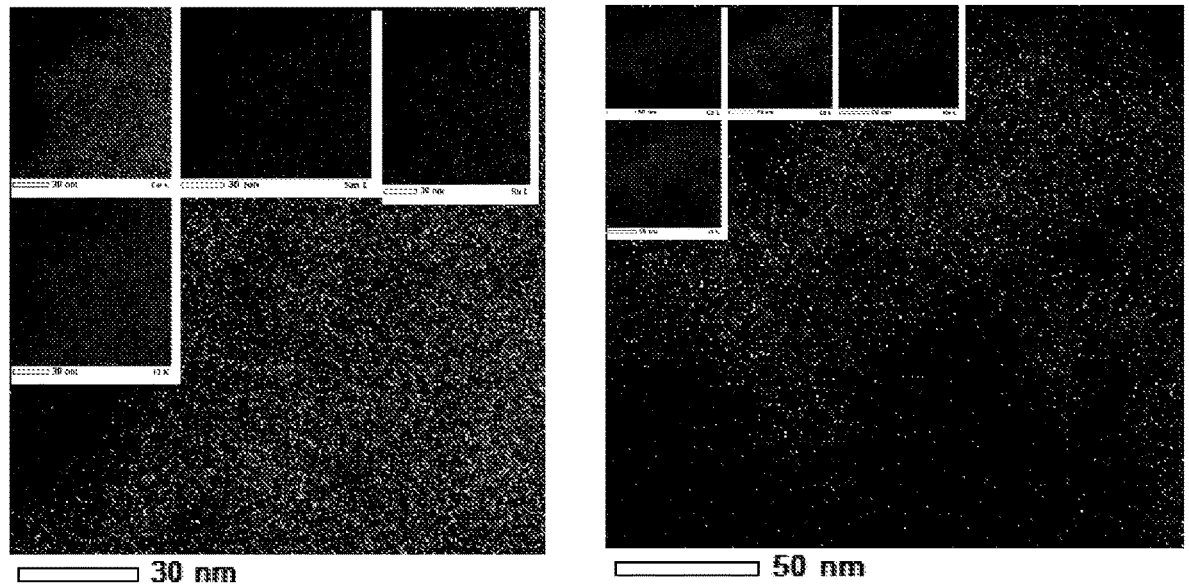
FIG. 5: a (CSR) and 5.b (CLR) elemental mapping of CeO$_2$ supported PTC oxide catalyst

FIG. 5.a (CSR) & FIG. 5.b (CLR) are clearly show the formation of a homogenous solid solution of (Ce.Sm/La.Ru) oxides and dispersion of elements on ceria surface as it is evenly representing the elemental mapping of $CeO_2$ supported PTC oxide catalyst respectively.

Figure 6:
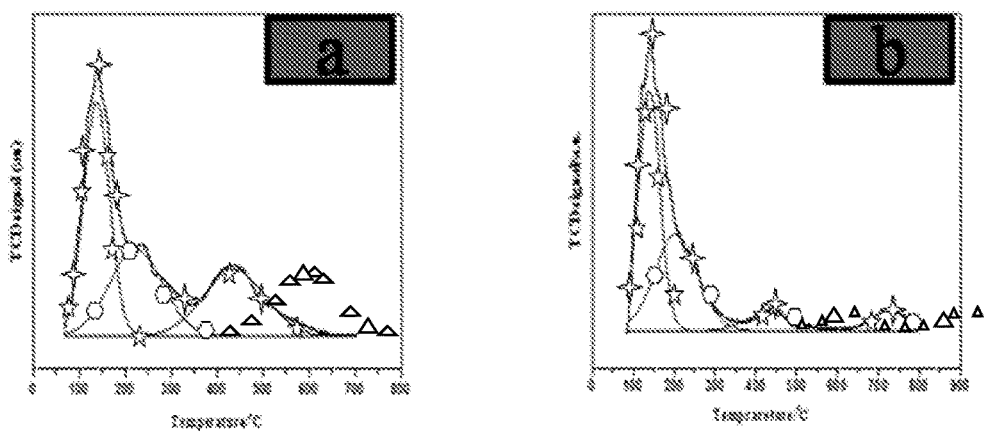
FIG. 6: a, b NH$_3$-TPD plot of CeO$_2$ supported PTC oxide catalyst (CSR and CLR) respectively
Figure 7:
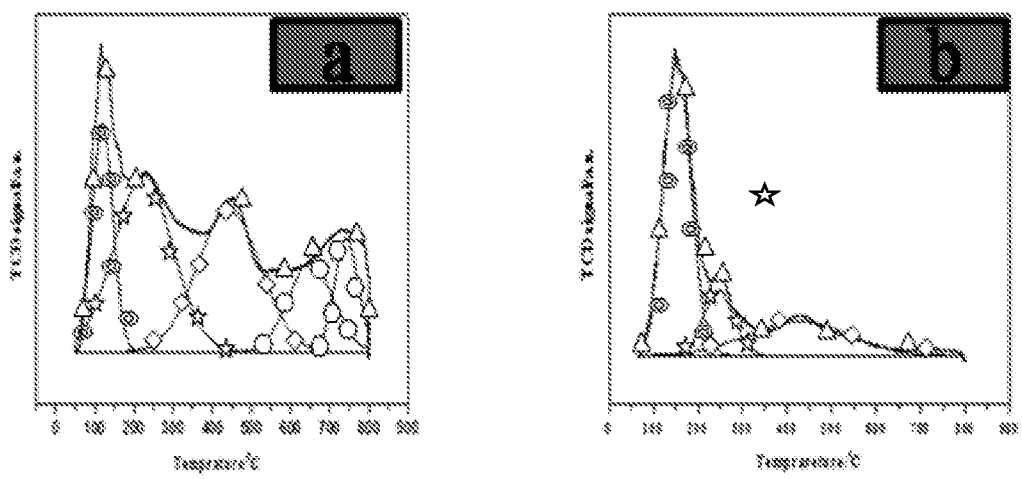
FIG. 7: a, b CO$_2$-TPD plot of CeO$_2$ supported PTC oxide catalyst (CSR and CLR) respectively

The density of acid/base sites on $CeO_2$ supported catalysts is quantified by $NH_3/CO_2$-TPD at different desorption peaks at 50-200° C., 200-400° C. and 400-800° C. represents the weak, medium and strong sites, respectively (FIG. 6&7.a,b) (Table 1). The $CeO_2$ catalyst is having a large amount of strong acidity/basicity at (400° C.-800° C.).

The PTC catalysts are having considerable amount of acidity/basicity at the strong (400° C.-800° C.) site. The phase transfer ceria supported PTC catalysts CSR/CLR are amphoteric in nature as it is having acidity 0.43 mmol/g, 0.49 mmol/g, and basicity 0.41 mmol/g, 0.49 mmol/g respectively. This acidity and basicity parameters might be responsible for the high selectivity of hydration of nitrile towards their corresponding amide.

Figure 8:
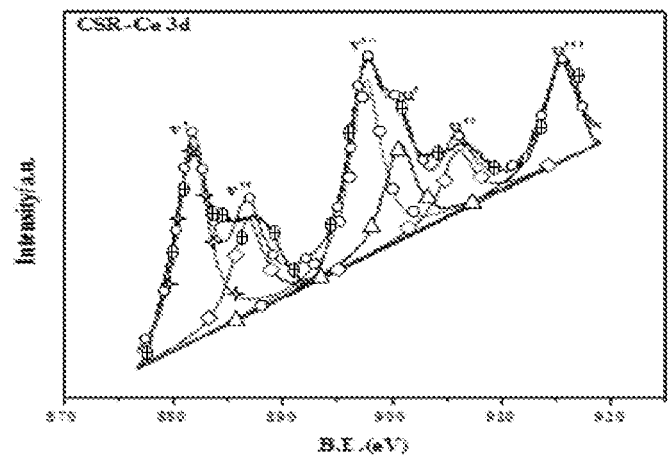
FIG. 8: a (CSR-Ce 3d) and FIG. 8.b (CLR-Ce 3d,) XPS spectra of CeO$_2$ supported PTC oxide catalyst, respectively.
Figure 8:
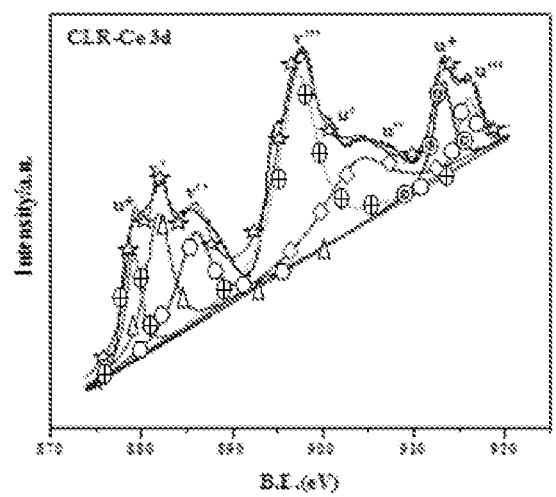

FIG. 8.a (CSR) and FIG. 8.b,c. (CLR) reveals the X-ray photoelectron spectra of the Ce 3d, La 3d core levels. No significant intensity for Sm 3d, Ru 3d spectra could be observed and this indicates the contribution of these elements on the catalyst surface under XPS conditions is very small. FIG. 8.a (CSR) and FIG. 8.b (CLR) fitted with six and eight peaks corresponding to Ce-3d3/2 and Ce-3d5/2 spin-orbit components. The peaks ranging from of u' (900-901.2), u"(905.94-907.83) and u'" (915.37-916.13) corresponds to Ce4+3d3/2, while v' (881.76-882.01), v"(886.04-886.61) and v'" (897.58-897.92) corresponds to Ce4+3d5/2. The peaks assigned to u'(900-901.2) and v'(881.76-882.01) describes to Ce3+3d5/2 species FIG. 8.c shows only one spectrum at 838.5 eV which is addressing to La 3d5/2 and the defected ceria sites (Ce3+) and lanthanum (La2+). These are indicating that present synthesized ceria supported PTC is having high oxygen storage capacity, because of the presence of Ce3+ and La2+. Sm may have formed a homogeneous solid solution with Ce or it may be present as elemental Sm so no spectrum corresponds to Sm is observed in this XPS data.

Figure 9:
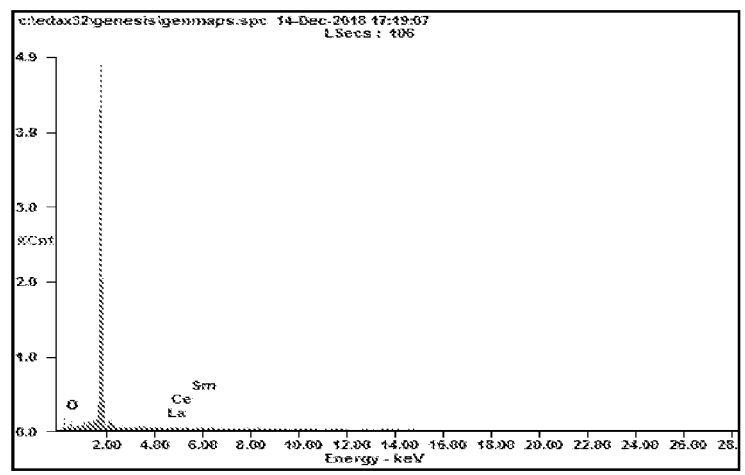
FIG. 9: a (CSR) and FIG. 9.b (CLR) SEM-EDAX profile of CeO2 supported PTC oxide catalyst respectively
Figure 9:
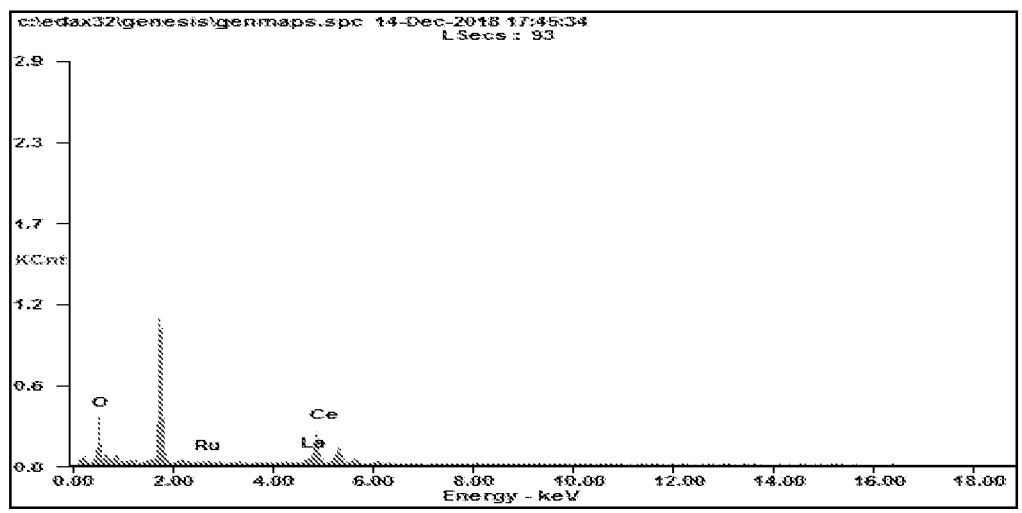

Table.2. FIG. 9.a., (CSR) and FIG. 9.b, (CLR) represent the energy dispersive X-ray spectroscopy (EDS) spectrum of Ce, Sm, La, Ru and O peaks which are related to its respective metal oxides presence in $CeO_2$ supported PTC oxide catalysts, respectively. The EDS data is also agreeing with HRTEM (FIG. 3.c-FIG. 3.e) and elemental mapping data (FIGS. 5.a and 5.b) where the homogenous dispersion of Ce, Sm, La, Ru, and O has been found.

TABLE 2

EDS data for different ceria supported catalyst (CSR and CLR respectively)

| Catalyst | CSR | | | | CLR | | | |
|---|---|---|---|---|---|---|---|---|
| Element | Ce | Sm | Ru | O | Ce | La | Ru | O |
| Wt. % | 17.77 | 16.87 | — | 52.87 | 61.37 | 8.09 | 1.11 | 29.43 |
| At. % | 3.49 | 3.09 | — | 90.95 | 18.66 | 2.48 | 0.47 | 78.39 |

Figure 10:
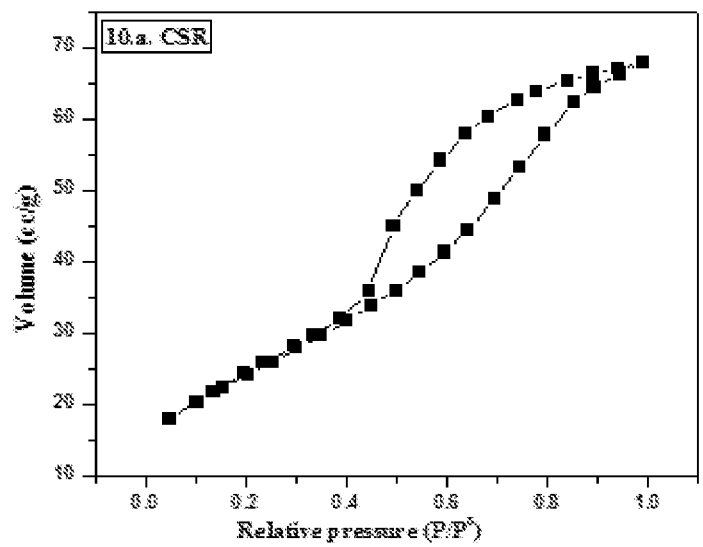
FIG. 10: a, b N$_2$-physisorption isotherm of ceria supported PTC samples CSR and CLR
Figure 10:
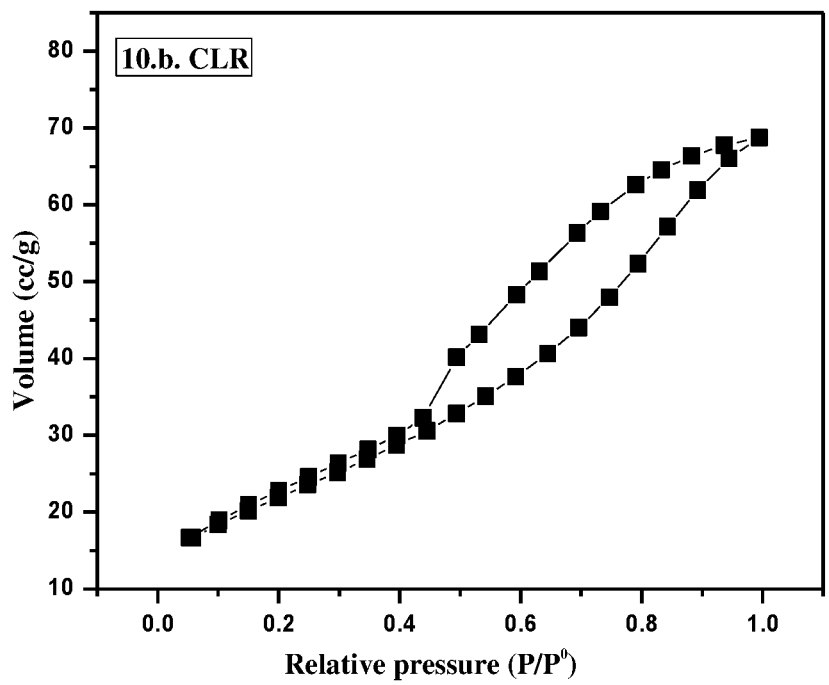

FIG. 10.a & b. Presents the $N_2$ adsorption-desorption isotherms at −196° C. and the pore size distribution (PSD) according to the Barrett-Joyner-Halenda (BJH) method for the phase transfer ceria supported PTC samples. The International Union of Pure and Applied Chemistry (IUPAC) classifies the shapes of the adsorption isotherms for samples (FIG. 10.a & b) as type IV with a hysteresis loop, which is associated with capillary condensation in the mesopores. The first part of the isotherm, where relative pressure p/p°≈0.3 for CSR/CLR catalysts can be attributed to monolayer adsorption. This phenomenon is related to the presence of agglomerates, i.e., an assembly of particles rigidly joined together. Specific surface area (SBET), total pore volume and average pore size for ceria supported PTC. CSR/CLR were found to be 86.75 m2/g, 79 m2/g, 0.105 cc/g, 0.106 cc/g and 24 Å, 26.9 Å respectively (FIG. 10.a & b).

Figure 11:
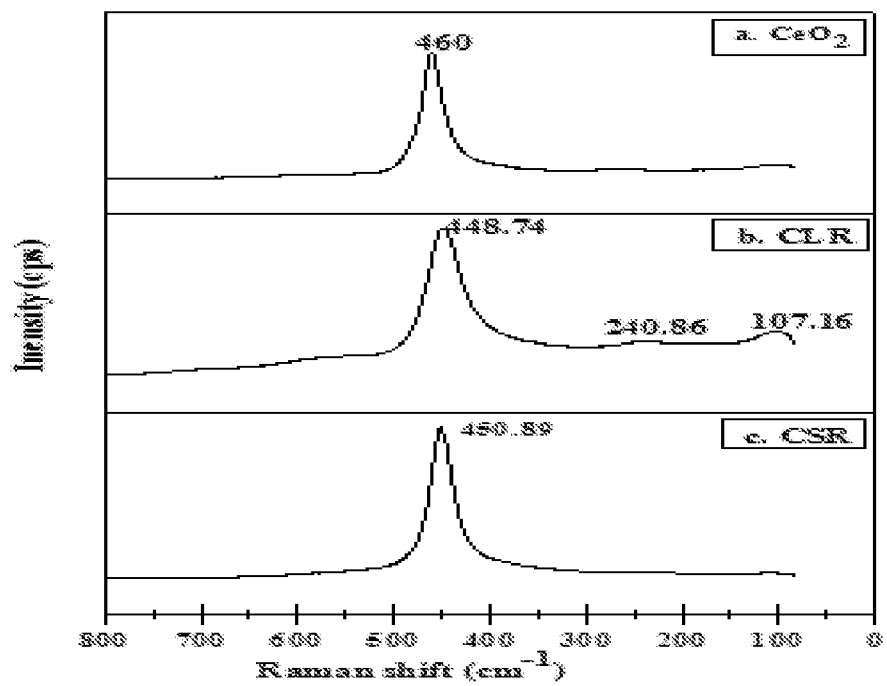
FIG. 11: Raman spectra of the synthesized catalysts (CLR/CSR) represented as b and c, respectively compared with std. CeO2 (Dai-ichi) sample.

FIG. 11 discloses Raman spectra of the synthesized catalysts (CLR/CSR) represented as b and c respectively compeered with std. $CeO_2$ (Dai-ichi) sample. Raman spectra of the pure CeO2 (FIG. 11.a) is giving a prominent high intense peak at 460 cm-1, which is attributed to the Raman-active vibrational mode of cubic fluorite-type structure this results agreeing with XRD results and confirms the formation of cubic fluorite type phase formation in the catalyst. This can be viewed as an asymmetric breathing mode of the oxygen atoms around the cerium ions and is sensitive to any disorder in the oxygen sublattice resulting from nonstoichiometry. The band at 460 cm-1 is hardly changed in intensity but is shifted to a lower frequency for CSR and CLR sample (450.89 cm-1 and 448.74 cm-1) in the case of the $CeO_2$ supported (Sm/La) Ru samples respectively. This remarkable observation is because the insertion of (Sm/La) Ru ions into CeO2 which decreases the vibrational frequency of the metal-anion band accredited to both a larger atomic mass of Sm, La, and Ru than that of Ce as well as the variation of the lattice parameter. The shift in the frequencies in both catalysts reveals the formation of ceria solid solution with (Sm/La) Ru ions, which result the different oxidation states for Ceria ($Ce^{4+}$ and $Ce^{3+}$), Samarium ($Sm^{3+}$) and $La^{2+}$ for lanthanum where Ru oxidation state was disappeared as its weight percent is very low in the catalyst. The different oxidation states are responsible for more affinity towards oxygen, in turn, having more oxygen storage capacity.

Figure 13:
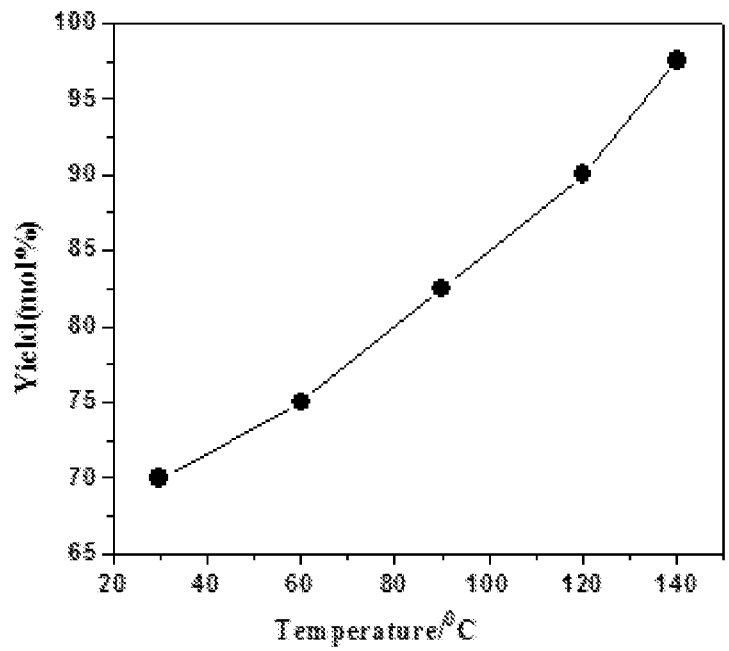
FIG. 13: Effect of reaction temperature on the rate of 2-cyanopyridine hydration react in under reflux condition: over ceria supported PTC mixed metal oxide catalyst at various temperature conditions from 30 to 140° C. The reaction conditions; -Cyanopyridine:H$_2$O (molar ratio) 1:10, Catalyst loading –10 wt % (with respect to 2-cyanopyridine loading), time-6 h.

FIG. 13 discloses temperature study for ceria based mixed metal oxide catalyst. Reaction condition used 2-Cyanopyridine:$H_2O$ (molar ratio) 1:10, Catalyst loading −10 wt % (with respect to 2-cyanopyridine loading), time—6 h.

Experimental results show that the catalyst is active for the hydration reactions during the temperature range of 30° C. to 140° C. For the residence time of 6 hrs it showing maximum conversion at 140° C. which is 97% with 100% selectivity.

Figure 14:
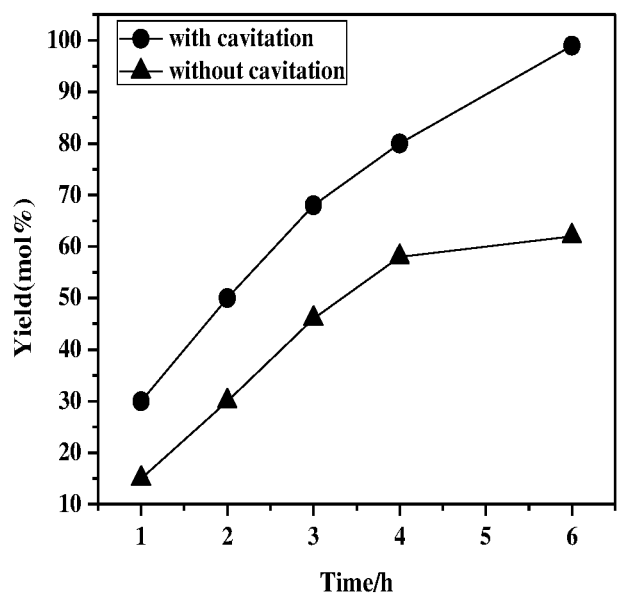
FIG. 14: The Influences of ultrasonic cavitation has been studied with the following reaction condition:—2-Cyanopyridine:H2O (molar ratio) 1:10, Catalyst loading –10 wt % (with respect to 2-cyanopyridine loading). The reaction mixture was stirred at 600 rpm, reaction temperature for cavitations experiments 35° C. and 60° C. without cavitations experiments.

FIG. 14 discloses the effect of cavitation for the hydration of nitrile over Ceria based mixed metal oxide. Reaction condition used 2-Cyanopyridine:$H_2O$ (molar ratio) 1:10, Catalyst loading −10 wt % (with respect to 2-cyanopyridine loading).

FIG. 14 elaborates the comparison between catalyst activity observed with ultrasonic cavitation and without cavitation (conventional method). Experimental results clearly show that there is a remarkable improvement in catalyst activity with cavitation inception.

Figure 15:
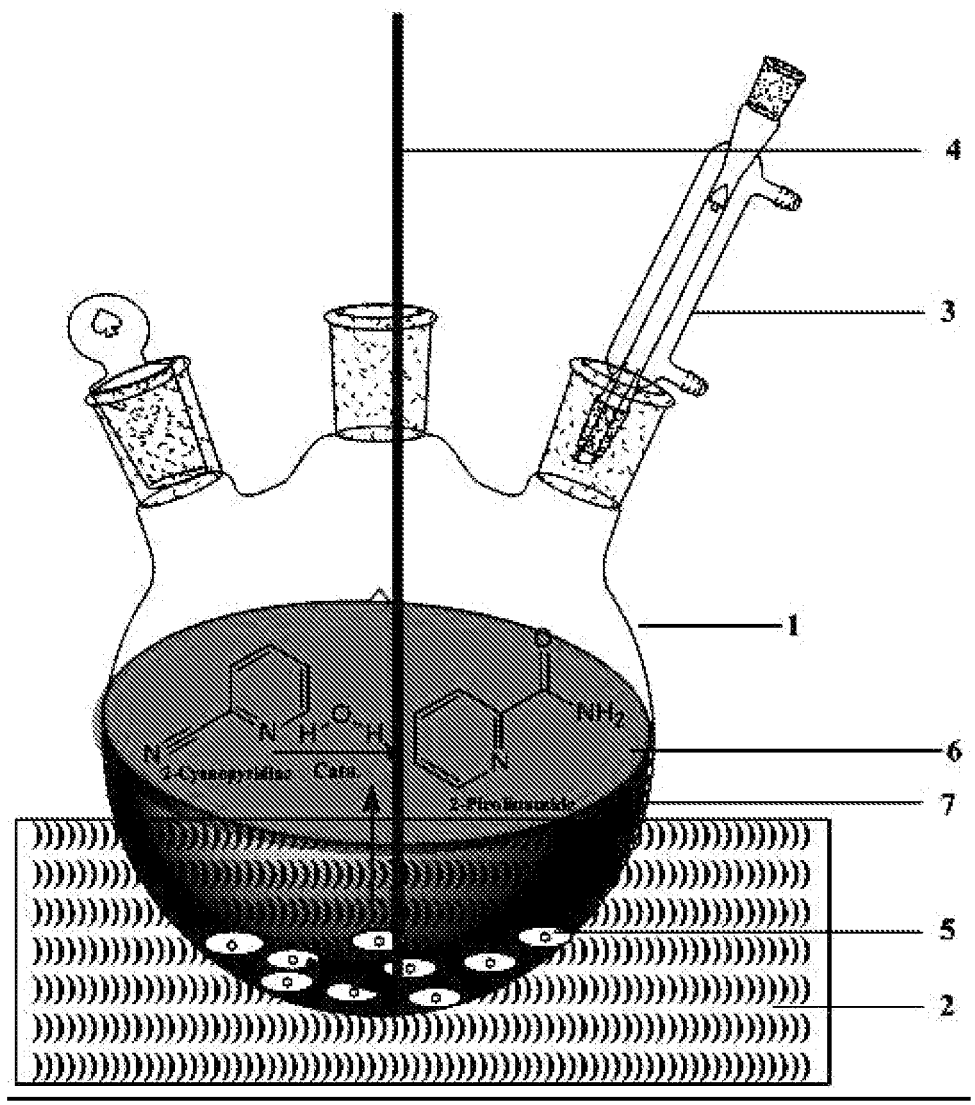
FIG. 15: Experimental Reactor Set up for cavitation experiments

FIG. 15 discloses Experimental Reactor Set up for cavitation experiments. The experimental set up consists of a two neck round bottom flask with a water cooling reflux condenser, which is placed in an ultrasonic cavitation water bath (frequency 35 kHz). The temperature of the reactor maintained with the help of cooling coil submerged in water bath. The first measured the quantity of reactants is charged into the round bottom flask with desired molar ratios. Then reaction is started by setting desired stirrer rotation and Cavitation frequency (35 kHz). The reaction mass is stirred under the cavitation for 6 hrs then reaction is stopped. The resulting mixture was extracted with dichloromethane (DCM-30 mL) and used for GC analysis.

The effect of cavitations for the hydration of nitrile to the corresponding amide is done with different intervals of time (1 h-6 h) at the temperature 35° C. (maintained by providing cooling coil submersed in cavitation bath). The reaction result revealed that the conversion increases linearly over time with or without ultrasonic irradiation. However, with ultra-sonication cavitation high rate of reaction is observed in comparison with reaction conducted under the conventional reflux method (without ultra-sonication) over time (FIG. 14).

The present invention further provides product analysis. Nitrile conversion and yield of hydrated products are determined the analyzing conditions were as follows; Column, 30 m×0.525 mm i.d., HP5 capillary column, injection temperature, 250° C.; FID detector (300° C.). Yields were determined from the standard curve.

Examples The following examples are given by way of illustration; therefore, they should not be construed to limit the scope of the invention.

Example 1: Catalyst Synthesis
Ce:La/Sm:Ru-(90:9.5:0.5 wt Ratio)

Solution—A: Ceria Nitrate hexahydrate as precursor was dissolved in 20 ml of distilled water and keeping under vigorous stirring at 550 rpm under ultra-sonic cavitation frequency 15-100 kHz by using the ultrasonic horn. The addition of precursor started at 5° C. by keeping beaker in ice bath & continued until solution temperature reaches 25° C.

Solution—B: La/Sm precursor was taken in the Ru precursor solution (5 mL) by adding excess 5 ml $H_2O$.

Sol. B was added dropwise into Sol. A with constant stirring at RT (25° C.). The yellowish slurry formed. The formed slurry was further kept for aging @80° C. for 24 h. After completion of aging, the catalyst is subjected to drying @180° C. for 18 h. Dried catalyst had been calcined with following temperature-programmed with heating ramp rate of 2° C./min initially heated to 200° C. where it is kept constant for 3 h, then further heated to 500° C., where it is kept constant for next 3 h and then finally heated to 900° C. where it is kept constant for 18 h.

Example 2: Catalyst Synthesis CSR (Ce-Sa-Ru) and CLR (Ce—La—Ru)

The catalyst synthesis has been done with the following two-step process:

Step 1 Solution A: Ceria nitrate hexahydrate (Cerium (III) 99.99% (Sigma Aldrich) used as precursor, and dissolved in 20 ml of distilled water and kept under vigorous stirring at 550 rpm.

Step 2 Solution—B: La/Sm (lanthanum/samarium (III) nitrate hexahydrate-99.99% (Sigma Aldrich) precursor was taken and dissolved in distilled water. Ru precursor (ruthenium (III) chloride-99.98% hydrate solution) is added to the La/Sa solution followed by adding excess amount of $H_2O$ to dissolve the precursors completely.

Step 3 Solution B was added dropwise to Solution A with constant stirring at 85° C. where yellowish slurry was formed. The formed slurry was kept for aging at 150° C. for 5 h with stirring at about 700 rpm. After completion of aging, the catalyst is subjected to drying at 180° C. for 6 h. Dried catalyst had been calcined by heating at ramp rate of 2° C./min initially and heated to 200° C. where it was kept constant for 3 h, then further heated to 500° C., where it was kept constant for next 3 h and then finally heated to 900° C. where it was kept constant for 12 h. The subsequently calcined catalysts by using different promoters (Sm/La) have been denoted as CSR (Ce-Sa-Ru) and CLR (Ce—La—Ru), respectively.

Example 3: Catalytic Activity Study

Starting materials like 2-Cyanopyridine (99%) and product standards like 2-Picolinamide (2-PA) 98% were procured from Sigma Aldrich. The extraction solvents like 1, 2 Dichloroethane (EDC, AR grade) was obtained from Chemlabs. Refer FIG. 13

The catalyst activity was tested for the hydration reaction in which 2-Cyanopyridine was reacted with water to form 2-Picolinamide as the desired product. This reaction was conducted in a round bottom flask connected with reflux condenser. The required heat of reaction was supplied by oil heating bath. The effect of ultrasonic cavitation was also tested for the same reaction for which round bottom flask was submerged in ultra-sonic cavitation bath. Nitrile conversion and yield of the reaction was determined by GC Agilent (model number-7890 A) using HP-5 capillary column (length-30 m×250 μm×0.25 μm)

Example 4: Hydration of Nitrile

Catalytic activity studies were carried out in a double-necked glass-round bottom flask fitted with a water-cooling condenser and placed in a temperature-controlled oil bath. In a typical experiment, required quantities of nitrile, water, and ceria based catalyst were taken in the reactor, and the reaction was conducted at (temperature range of 30-140° C. for 6 h) for the time intervals of 1-6 hr. The resulting mixture was extracted with dichloromethane (DCM-30 mL) and used for GC analysis. Initially, Inventor has studied the hydration study using ceria based mixed metal oxide catalyst (phase transfer catalyst) at various temperature conditions from 30 to 140° C. by following reaction conditions-2-CP: $H_2O$ molar ratio (1:1) where 2-cyanopyridine (2-CP) (5.2485 g, 50.41 mmol) and $H_2O$ (1.0 g, 55 mmol), $CeO_2$ catalyst (0.52 g, 3 mmol), 2-CP:$CeO_2$ catalyst (1:10 wt % with respect to 2-CP), have been taken in three-necked glass-round bottom flask fitted with a condenser and placed in a temperature-controlled oil bath at desired temperature. The reaction results are as shown in FIG. 13-14

Figure 12:
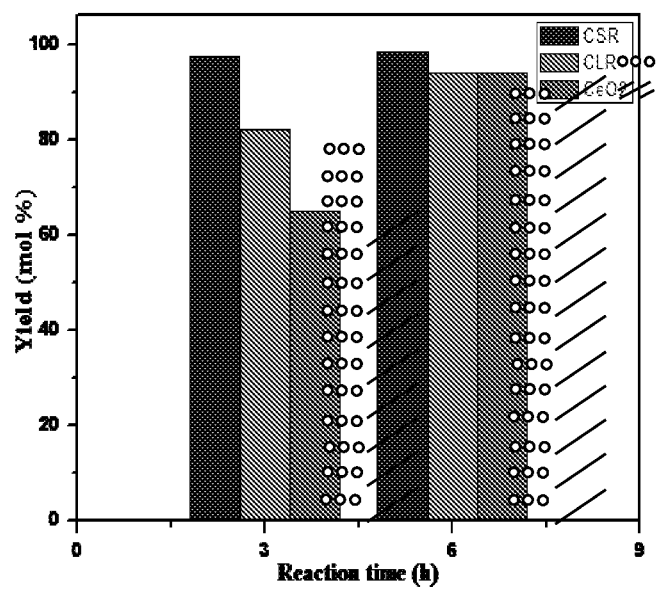
FIG. 12: Catalyst activity comparison between CSR/CLR and pure CeO$_2$ (commercial) catalyst on hydration of 2-cyanopyridine under reflux condition (water) at various reaction time (3 h and 6 h), 2-Cyanopyridine:H$_2$O (molar ratio) 1:1, Catalyst loading –10 wt % (with respect to 2-cyanopyridine loading), temperature 140° C.

Example 5: Hydration of Nitrile Catalyzed by CSR/CLR and Commercial $CeO_2$ Catalyst without Cavitations Influence Catalytic activity studies were carried out in a double-necked glass-round bottom flask fitted with a water-cooled condenser and placed in a temperature-controlled oil bath. In a typical experiment, required quantities of 2-Cyanopyridine, water, and ceria supported PTC catalysts were taken in the reactor, and the reaction was conducted at temperature 140° C., up to 3 h and 6 hr. The resulting mixture was extracted with dichloromethane (DCM-30 mL) and used for GC analysis. Initially, inventor have studied the hydration using ceria supported mixed metal oxide catalyst at temperature 140° C. by following reaction conditions:—2-CP: $H_2O$ molar ratio (1:1) where 2-cyanopyridine (2-CP) (5.2485 g, 50.41 mmol) and $H_2O$ (1.0 g, 55 mmol), two different ceria supported mixed metal oxides catalysts were used. CSR/CLR and pure ceria (commercial) (approx. —0.52 g, 3 mmol), the amount of the catalyst was 10 wt % with respect to 2-CP. This reaction mixture, along with catalyst, has been taken in a three-necked glass-round bottom flask fitted with a condenser and placed in a temperature-controlled oil bath at desired temperature. Reaction results are as shown in FIG. 12; these experimental results show that among ceria supported mixed metal oxides catalyst (CSR/CLR) and pure $CeO_2$ (commercial), CSR catalyst is more active for the hydration than the CLR and pure $CeO_2$ catalyst.

The catalytic activity also studied for the residence time of 3 h and 6 h at 140° C. The results of the experiments demonstrate that the conversion shown by the CSR (Ce—Sm—Ru) catalyst is higher than the CLR (Ce—La—Ru) and pure $CeO_2$ catalyst. The characterization data reveals that the CSR catalyst is having a higher surface area when compared to CLR catalyst (table-1) and reported commercial $CeO_2$. Apart from this, CSR catalyst is also having an appropriate ratio of acidic to basic site. The other reason for the higher activity of the CSR catalyst can be substantiated with help of elemental mapping (FIG. 5a), which reveals the uniform dispersion of the elements over the catalyst surface and the formation of homogenous solid solution, which makes this catalyst superior to the other tested catalysts.

Example 6: Effect of Temperature for Hydration of Nitrile (2-Cyanopyridine) Reaction Catalyzed by CSR Catalyst without Cavitations Influence The effect of temperature on the reaction between 2-Cyanopyridine and water to form 2-Picolinamide was studied under similar conditions. For this experiment, the temperature was varied from 30 to 140° C. It is demonstrated that the reactivity is increased with an increase in temperature. The collision of the reactants at a higher temperature is also increased. Hence, the apparent yield of the amide is increased at higher temperatures. These results are demonstrated by above in FIG. 13. which a plot of temperature is plotted against yield of amide (2-Picolinamide).

Example 7: Effect of Ultrasound and without Ultrasound on the Reaction

Ultrasound has been used to accelerate the chemical reactions proceed via the formation and adiabatic collapse of transient cavitations bubbles. The ultrasonic effect induces very high local pressure and temperatures inside the bubbles and enhances mass transfer and turbulent flow in the liquids so to use ultrasonic cavitation for any chemical process need to have a durable, thermally stable and high strength martial as a catalyst which can withstand the thermal and pressure shocks during the reaction. Synthesized CSR and CRL catalysts are having all these properties and proven as the best catalyst for such reaction conditions. Here inventor has used the ultrasound to accelerate the reaction. Cavitation can be produced by ultrasound as well as hydrodynamically also. Here in this invention, inventor has exemplified the use of an ultrasound approach to decreases time, increases yields of products by creating the energy in micro surroundings. The cavitation approach offered several advantages such as higher yields, enhanced organic reaction rates, milder reaction conditions, and waste minimization compared with traditional methods and saving money and energy as it has enhanced the rate of the reaction enormously due to mass transfer and effective mixing.

The effect of cavitations for the hydration of nitrile to the corresponding amide was done for different intervals of time (1-6 h). The reaction temperature was maintained at 35° C. for cavitations experiments and 60° C. for without cavitations experiments. The result indicates that the conversion increases linearly over time with or without ultrasonic irradiation. It is to be noted that as collapsing cavities releases highly unstable OH radicals in the solution and helps for the reaction in the presence of catalyst. However, with ultra-sonication cavitations, high rate of reaction is observed at 35° C. in comparison to the reaction conducted under conventional reflux method (without ultra-sonication) over time (FIG. 14).

Example 8: Effect of Cavitation Phenomena on the Catalytic Activity

Catalytic activity studies were carried out in a double-necked glass-round bottom flask fitted with a water-chilling condenser and placed in a temperature-controlled ultrasonic cavitation bath having the ultrasonic frequency of 35 kHz. In a typical experiment, required quantities of nitrile, water, and ceria based catalyst were taken in the reactor and the reaction was conducted at (temperature 35° C. for 6 h) for the time intervals of 1 hr to 6 hr. Same experiment conducted at same temperature conditions without cavitation also to check the effect of cavitation on hydration reaction, for analysis the resulting mixture was extracted with dichloromethane (DCM-30 mL) and used for GC analysis, here inventor have studied the hydration study using ceria based mixed metal oxide phase transfer catalyst at 35° C. by following reaction conditions-2-CP:$H_2O$ molar ratio (1:1) where 2-CP (5.2485 g, 50.41 mmol) and $H_2O$ (1.0 g, 55 mmol), $CeO_2$ catalyst (0.52 g, 3 mmol), 2-CP:$CeO_2$ catalyst (1:10 wt % with respect to 2-CP), at various time intervals (1 hr to 6 hr). The comparative results of reaction with and without ultrasonication at 35° C. at different time intervals are as shown in FIG. 14.

Advantages of the Invention

1. The catalyst combination is working at a low residence time of the reactants under the influence of cavitation energy.
2. Highly active catalyst to reduce the amount of catalyst loading.
3. This catalyst, along with cavitation inception, is found to be very active even at low molar ratio of the reactant with water for the ease of the product separation.
4. Even though catalyst loading were three times less (wt. %) than earlier reported (Masazumi Tamura, Hiroko Wakasugi, Ken-ichi Shimizu, and Atsushi Satsuma, Chemistry European journal, 2011, 17, 11428-11431), still gave very good catalytic activity ranging from 80-99% Conversion (30° C.-140° C., 3-6 h resp.) with 100% selectivity with reproducibility,
5. The catalyst along with cavitation inception found very active as it is showing 97% conversion for the residence time of 6 hrs whereas the same catalyst if tested without cavitation is showing 59% conversion for the same residence time at 35° C.
6. The catalyst is cost-effective recyclable and very easy to separate from the reaction mixture
7. The catalyst is having synergistically appropriate acidic as well as basic sites in the same catalyst.
8. The catalyst is working at room temperature.

The invention claimed is:
1. A metal oxide-catalyzed process for hydration of nitrile using a catalyst of formula (I), under the influence of ultrasonic cavitation of Frequency 16-28 khz to achieve the maximum conversion and selectivity at lower temperature (35° C.) comprising:
heating a reaction mixture of nitrile, solvent, catalyst of formula (I), with or without cavitation influence, at a temperature range of 30 to 140° C. for a time period in the range of 5 to 10 hours (without cavitation and 1 hr with cavitation), to form a respective amide, wherein said nitrile is selected from aliphatic or aromatic nitrile, wherein the catalyst of formula (I) is represented as:

$$A_X B_Y C_Z \quad \text{Formula (I)}$$

wherein:
A is a promoter, wherein said promoter is a lanthanide, wherein said lanthanide is selected from the group consisting of divalent metals, trivalent metals and mixtures of oxides of said metals;
x is the weight % of the promoter in the range of 0.01-99;
B is a support, wherein said support is a transition element or an inner transition element;
y is the weight % of catalyst support in the range of 0.01-99;
C is a co-promoter, wherein said co-promoter is selected from oxides of transition elements having variable oxidation states ranging from 1 to 8 from group number VIII;
z is the weight % of the co-promoter in the range of 0.01-25; and
x+y≥75 weight %.
2. The metal oxide-catalyzed process as claimed in claim 1, wherein said nitrile is selected from the group consisting of 2-Cyanopyridine, 3-Cyanopyridine, 4-Cyanopyridine, Benzonitrile, Acetonitrile, O-tolunitrile and methoxyacetonitrile.

3. The metal oxide-catalyzed process as claimed in claim 1, wherein said solvent is selected from the group consisting of water, methanol, ethanol and mixture thereof.

4. The metal oxide-catalyzed process as claimed in claim 1, wherein said amide is selected from the group consisting of 2-Picolinamide, 3-Picolinamide, 4-Picolinamide, Benzamide, Acetamide, O-toluamide and methoxyacetamide.

5. A catalyst of formula (I) represented as:

$$A_X B_Y C_Z \qquad \text{Formula (I)}$$

wherein:
- A is a promoter, wherein said promoter is a lanthanide, wherein said lanthanide is selected from the group consisting of divalent metals, trivalent metals and mixtures of oxides of said metals;
- x is the weight % of the promoter in the range of 0.01-99;
- B is a support, wherein said support is a transition element or an inner transition element;
- y is the weight % of catalyst support in the range of 0.01-99;
- C is a co-promoter, wherein said co-promoter is selected from oxides of transition elements having variable oxidation states ranging from 1 to 8 from group number VIII;
- z is the weight % of the co-promoter in the range of 0.01-25; and
- x+y≥75 weight %;
- wherein A is not praseodymium; and
- wherein B is not praseodymium.

6. A process for the preparation of the catalyst of formula (I) as claimed in claim 5, comprising the steps of:

a) dissolving metal nitrate hexahydrate in a solvent followed by vigorous stirring, wherein the addition of precursor started at 5° C. by keeping beaker in the chiller and continued until solution temperature reaches 25° C. to 30° C. to form a solution A;

b) mixing a metal precursor 1 into a metal precursor 2 solution by adding an excess of solvent to form a solution B;

c) adding solution B of step (b) into solution A of step (a) with constant stirring at a temperature in the range of 25° C. to 30° C. to form slurry and;

d) aging the slurry of step (c) at the temperature in the range of 70° C. to 200° C. for a time period in the range of 24 to 30 hours followed by drying and calcination with ramp rate of 1-5° C./min to 150-220° C. for period in the range of 1-30 hrs to obtain a material; and e) cooling and fine crushing the material and further calcinations at 450-550° C. with ramp rate of 1-5° C./min for 1-30 hrs then finally heated to 900° C. and keeping constant for 5-50 h to form the catalyst of formula (I).

7. The process for the preparation of the catalyst of formula (I) as claimed in claim 6, wherein said metal nitrate hexahydrate of step (a) is cerium nitrate hexahydrate and said solvent of step (a) is selected from the group consisting of water, methanol, ethanol, and a mixture thereof.

8. The process for the preparation of the catalyst of formula (I) as claimed in claim 6, wherein said metal precursor 1 of step (b) is selected from lanthanum or samarium salt and said metal precursor 2 of step (b) is ruthenium salt.

* * * * *